(12) United States Patent
Mauer

(10) Patent No.: US 7,445,096 B2
(45) Date of Patent: Nov. 4, 2008

(54) PISTON-CYLINDER UNIT AND PROCESS FOR PRODUCING A PISTON-CYLINDER UNIT

(75) Inventor: Dirk Mauer, Nauort (DE)

(73) Assignee: Stabilus GmbH, Koblenz (DE)

( * ) Notice: Subject to any disclaimer, the term of this patent is extended or adjusted under 35 U.S.C. 154(b) by 185 days.

(21) Appl. No.: 11/297,012

(22) Filed: Dec. 8, 2005

(65) Prior Publication Data

US 2006/0157311 A1 Jul. 20, 2006

(30) Foreign Application Priority Data

Dec. 15, 2004 (DE) ................... 10 2004 060 304

(51) Int. Cl.
*F16F 9/38* (2006.01)
(52) U.S. Cl. .................... 188/322.12; 188/322.19; 29/888.061
(58) Field of Classification Search .......... 188/322.12, 188/322.19; 427/421.1, 422, 424; 29/888.06, 29/888.061; 92/169.1
See application file for complete search history.

(56) References Cited

U.S. PATENT DOCUMENTS

| | | | | |
|---|---|---|---|---|
| 2,992,864 | A * | 7/1961 | Bourcier | 267/64.13 |
| 3,379,445 | A | 4/1968 | Fisher | |
| 3,904,346 | A * | 9/1975 | Shaw et al. | 427/481 |
| 4,281,884 | A * | 8/1981 | Freitag et al. | 439/32 |
| 4,676,518 | A | 6/1987 | Kartchner et al. | |
| 4,718,647 | A | 1/1988 | Ludwig | |
| 5,014,601 | A * | 5/1991 | Sundholm | 29/888.061 |
| 5,620,067 | A * | 4/1997 | Bauer et al. | 188/322.19 |
| 5,791,445 | A | 8/1998 | Kaufmann et al. | |
| 6,007,130 | A * | 12/1999 | Clare et al. | 188/322.12 |
| 6,536,330 | B2 | 3/2003 | Karlsson et al. | |
| 6,776,270 | B2 | 8/2004 | Krog | |
| 7,219,780 | B2 * | 5/2007 | Thurmann et al. | 188/322.12 |
| 2003/0136620 | A1 | 7/2003 | Krog | |

FOREIGN PATENT DOCUMENTS

| | | |
|---|---|---|
| DE | 28 26 563 | 1/1979 |
| DE | 34 23 598 | 1/1986 |

(Continued)

OTHER PUBLICATIONS

Office Action dated May 4, 2005 issued for the corresponding German Application No. 10 2004 060 304.0-14.

(Continued)

*Primary Examiner*—Thomas J Williams
(74) *Attorney, Agent, or Firm*—Cohen Pontani Lieberman & Pavane LLP

(57) ABSTRACT

A piston-cylinder unit, in particular gas spring, has a cylindrical pressure tube which has a surface protection on its outer surface. The piston-cylinder unit further has a piston, which is axially displaceable within the pressure tube and has a piston rod. The piston rod is led out of the pressure tube in a sealed manner through an end side opening at a piston-rod-exit end side of the pressure tube. To improve the corrosion prevention properties and the durability of the surface protection, an end region of the pressure tube which starts from the piston-rod-exit end side is excluded from the surface protection. A process for producing such a piston-cylinder unit is also disclosed.

9 Claims, 2 Drawing Sheets

FOREIGN PATENT DOCUMENTS

| | | |
|---|---|---|
| DE | 34 34 011 | 3/1986 |
| DE | 39 00 690 | 7/1990 |
| DE | 40 15 084 | 11/1991 |
| DE | 42 09 985 | 9/1993 |
| DE | 196 04 557 | 7/1997 |
| DE | 197 21 816 | 12/1997 |
| DE | 19721816 | 12/1997 |
| DE | 298 06 048 | 7/1998 |
| DE | 299 09 294 | 8/1999 |
| DE | 100 52 788 | 6/2001 |
| DE | 102 02 529 | 8/2003 |
| DE | 10 2004 014 250 | 11/2004 |
| EP | 0 364 851 | 10/1989 |
| EP | 1 331 418 | 7/2003 |
| EP | 1 416 189 | 5/2004 |
| GB | 1 270 088 | 4/1972 |
| GB | 1 365 551 | 9/1974 |
| GB | 2 000 251 | 1/1979 |
| JP | 56-153647 | 4/1955 |
| JP | 48-6112 | 1/1973 |
| JP | 57-50606 | 5/1982 |
| JP | 59-101048 | 7/1984 |
| JP | 60-23025 | 7/1985 |
| JP | 60-176272 | 11/1985 |
| JP | 62-4752 | 2/1987 |
| JP | 63-162142 | 10/1988 |
| JP | 63-57172 | 11/1988 |
| JP | 03-16536 | 3/1991 |
| JP | 06-23573 | 6/1994 |
| JP | 07-5292 | 2/1995 |
| JP | 07-28431 | 6/1995 |
| JP | 08-266993 | 10/1996 |

OTHER PUBLICATIONS

Search Report dated Apr. 6, 2006 issued for corresponding European Application No. EP 05 025 274.1.

\* cited by examiner

PISTON-CYLINDER UNIT AND PROCESS FOR PRODUCING A PISTON-CYLINDER UNIT

BACKGROUND OF THE INVENTION

The invention relates to a piston-cylinder unit, in particular gas spring, having a cylindrical pressure tube which has a surface protection on its outer side, and having a piston, which is axially displaceable within the pressure tube and has a piston rod, the piston rod being led out of the pressure tube in a sealed manner through an end side opening at a piston-rod-exit end side of the pressure tube. The invention also relates to a process for producing a piston-cylinder unit, in particular a gas spring, having a cylindrical pressure tube and having a piston which is axially displaceable in the pressure tube and has a piston rod, the piston rod being led out of the pressure tube in a sealed manner at a piston-rod-exit end side of the pressure tube.

A piston-cylinder unit as described above and a process as described above are known in the context of a piston-cylinder unit whereof the pressure tube is provided with a shrink-fit hose consisting, for example, of a plastic as surface protection. The shrink-fit hose can if appropriate be adhesively bonded to the surface of the pressure tube which is covered by the shrink-fit hose by means of an adhesive. It is also possible for the shrink-fit hose to surround part of the piston-rod-exit end face of the pressure tube. With the surface protection which comprises a shrink-fit hose, it is relatively difficult to avoid possible fluctuations in the corrosion prevention properties of the surface protection.

SUMMARY OF THE INVENTION

Starting from the prior art, the present invention is based on the object of providing a piston-cylinder unit of the type described in the introduction which has improved corrosion prevention properties. The invention is also based on the object of providing a process of the type described in the introduction for producing a piston-cylinder unit with improved corrosion prevention properties.

According to the invention, the first object is achieved by excluding an end region of the pressure tube which starts from the piston-rod-exit end from the surface protection.

The end region of the pressure tube which is excluded from the surface protection can still be machined without the risk of damage to the surface protection. It is in this way possible to close and seal off the piston-rod-exit end of the pressure tube at low cost and while still ensuring a high operational reliability on the part of the piston-cylinder unit.

The surface protection may have a powder coating or a spray coating or a dip coating.

The surface protection is very resistant to corrosion in the long term on account of the powder coating, which in particular includes a powder coating layer. In addition to the good corrosion prevention properties of the surface protection which are achieved by the invention, a high impact strength and abrasion resistance of the powder coating advantageously also considerably reduces the risk of damage to the piston-cylinder unit caused by mechanical influences, in particular shocks, impacts and friction. Furthermore, the piston-cylinder unit according to the invention is especially resistant to oils, greases, and a wide range of chemicals. Overall, the surface protection has a significantly improved durability.

The invention comprises both piston-cylinder units with a single end piston rod and piston-cylinder units with a double end piston rod; in the latter case both ends of the pressure tube are piston-rod-exit ends, and an end region that is excluded from the powder coating is present starting from each of these ends.

According to an advantageous refinement of the invention, the pressure tube has a basecoat on its entire outwardly facing surface and the surface protection in particular the powder coating is arranged on the basecoat. This basecoat is both an adhesion promoter for the surface protection, in particular the powder coating and a means of protecting the pressure tube from corrosion. In this way, firstly a further improved durability of the surface protection, in particular of the powder coating, is achieved, and also a corrosion-reducing base protection is produced in particular for the end region of the pressure tube which is excluded from the surface protection, in particular from the powder coating. In addition to the outwardly facing surface of the pressure tube, it is also possible for at least part of the inwardly facing surface of the pressure tube to be provided with the basecoat.

The corrosion resistance of the piston-cylinder unit can advantageously be additionally increased in a simple way if, according to another refinement of the invention, the end region of the pressure tube which has been excluded from the surface protection, in particular from the powder coating, is wetted with a corrosion-prevention oil.

According to another advantageous refinement of the invention, the pressure tube has a protective cap which covers the end region of the pressure tube which has been excluded from the surface protection, in particular from the powder coating. In this way the end region is reliably protected from mechanical damage and also from corrosion environmental influences.

One could imagine the protective cap being joined to the pressure tube, for example by means of adhesive bonding, in order to be securely held on the pressure tube. On the other hand, secure seating of the protective cap on the pressure tube can be achieved in a particularly simple way if, according to an advantageous refinement of the invention, the protective cap consists of an elastomeric material. Moreover, a protective cap of this type can also achieve reliable sealing of the pressure tube.

It is particularly inexpensive if the protective cap, which may in principle also consist, for example of a metallic material, according to another advantageous refinement of the invention consists of a plastic.

According to another advantageous refinement of the invention, the pressure tube has a flange which is directed radially inwards, i.e. towards the pressure tube centre axis, at the piston-rod-exit end side. This produces a mechanically very stable and durable closure of the pressure tube; the end-side opening for the piston rod exit may at the same time be created by the flange.

In particular for the purpose of holding components arranged in the pressure tube, it is advantageous if, according to another refinement of the invention, the pressure tube has a bead which is directed radially inwards, i.e. faces towards the pressure tube centre axis, in the end region which has been excluded from the surface protection, in particular from the powder coating. Arranging the bead in the end region which has been excluded from the surface protection, in particular from the powder coating, prevents damage to the surface protection, in particular the powder coating, by means of the bead in a simple and particularly reliable way. It is preferable for the bead to be designed to run around the circumference of the pressure tube, although it may also be formed, for example, from short bead sections arranged in a row with free spaces between them.

According to an advantageous refinement of the invention, the flange and/or the bead supports a piston rod seal for sealing off the end side opening of the pressure tube and/or a piston rod guide in the axial direction. This results in a high degree of component integration, reliable sealing and a high mechanical stability for the piston-cylinder unit.

According to the invention, the second object mentioned above is achieved by producing the pressure tube with an open end, and subsequently applying a surface protection to the pressure tube, with the exclusion of an end region of the pressure tube starting from the open end, in a coating process, in particular in a powder coating process. The coating process may also be a spray coating process or a dip coating process.

The process according to the invention, which advantageously has a high level of process reliability is suitable, in particular, for the production of a piston-cylinder unit according to the invention as described above. Compared to a wet powder coating process, the powder coating process is significantly more reliable, less expensive, entails shorter process times and requires less use of energy. It is particularly advantageous that the process according to the invention can be carried out by machine and at least substantially in automated fashion. It also leads to a durable corrosion protection for the piston-cylinder unit. On account of the application of the surface protection, which in particular comprises a powder coating, to the pressure tube with the end side of the pressure tube open, it is advantageously possible for components that are to be arranged in the pressure tube, and in particular also pressure fluid, in particular gas, for a piston-cylinder unit designed as a compression spring, in particular a gas spring, to be introduced into the pressure tube only after the coating process, in particular the powder coating process which generally comprises a temperature step for firing, for example a powder coating, has been carried out thereby ruling out the possibility of damage to such components or the entire pressure tube on account of excessive thermal stresses. The powder coating process is generally an electrostatic surface coating process in which an electrically charged powder cloud is formed, charged powder particles are transported to an earthed surface of the pressure tube, the powder particles are deposited on the surface and electrically adhere to the surface and a powder layer with electrical self-limiting of the layer thickness is formed and fired in. The formation of the powder cloud can be carried out, for example using a spray gun and in a corona process by means of high voltage or in a tribokinetic process by means of friction of the powder particles at a gun tube and other friction partners.

It is in principle conceivable for the coating, in particular the powder coating, in the coating process to be applied to the pressure tube in a targeted way such that the end region of the pressure tube to be excluded remains clear. On the other hand, the coating process is greatly simplified if, according to an advantageous refinement of the invention, the end region starting from the open end side of the pressure tube, in order to be excluded, is covered when the coating process is being carried out.

According to another refinement of the invention, before the coating process, in particular the powder coating process, is carried out, a basecoat is advantageously applied to the entire outwardly facing surface of the pressure tube. The basecoat can also simplify the subsequent coating process, and in particular can improve the adhesion of the powder coating that is to be applied in the powder coating process to the pressure tube.

According to another advantageous refinement of the invention, after the coating process has been carried out, the piston and the piston rod are introduced into the pressure tube and the pressure tube is filled with a pressure fluid. This rules out possible damage to piston and/or piston rod during the coating process. Damage to the pressure tube, including other components contained in the pressure tube, such as for example a piston rod seal or a piston rod guide, which may be caused by overheating of the pressure fluid, in particular a gas used as pressure fluid, is also avoided in this way.

The pressure tube can be provided with holding and/or supporting elements in a particularly simple, inexpensive and reliable way if, according to an advantageous refinement of the invention, subsequently the pressure tube is flanged radially inwards at the open end side and/or a radially inwardly-directed bead is introduced into the end region of the pressure tube which has been excluded from the coating process, in particular from the powder coating process.

According to another advantageous refinement of the invention, finally a corrosion-resistant oil is applied to the end region which has been excluded from the coating process, in particular from the powder coating process, and a protective cap is fitted, with the result that the corrosion resistance of the piston-cylinder unit to be produced is further improved in a simple and inexpensive process section that is easy to automate.

BRIEF DESCRIPTION OF THE DRAWINGS

An exemplary embodiment of the invention is diagrammatically depicted in the drawing and explained in more detail in the text which follows. In the drawing.

Corresponding components are provided with the same reference designations throughout all the figures.

DETAILED DESCRIPTION OF THE PRESENTLY PREFERRED EMBODIMENTS

Figure 1:
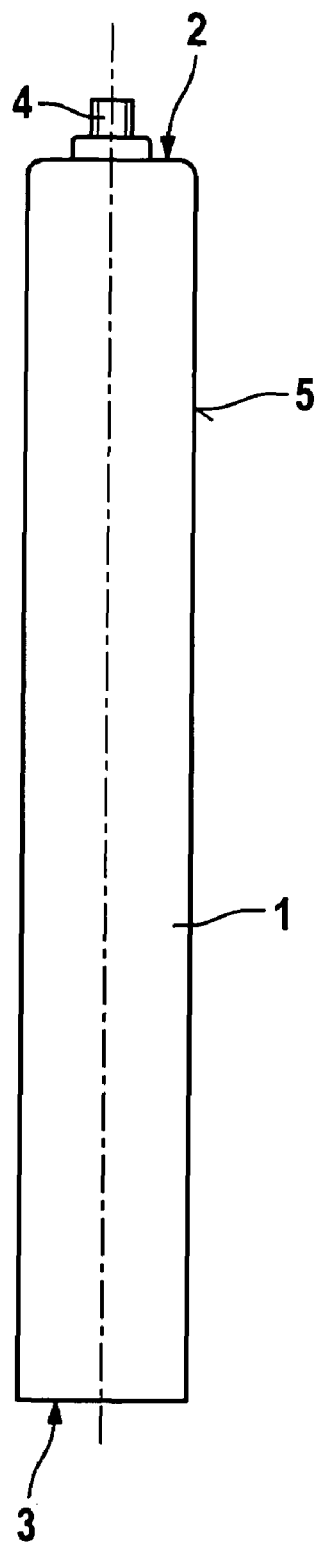
FIG. 1: shows a side view of a pressure tube.

FIG. 1 shows a side view of a metallic pressure tube 1 for a piston-cylinder unit. The pressure tube 1 is cylindrical in form and has a closed end 2 and an open end 3. At the closed end 2, the pressure tube 1 is provided with a threaded bolt 4. A connection piece for the piston-cylinder unit can be screwed on to the threaded bolt 4. To produce the piston-cylinder unit, first of all the pressure tube 1 is cleaned. Then a basecoat in the form of a corrosion prevention layer is applied to the entire outwardly facing surface 5 of the pressure tube 1 and solidified by drying.

Figure 2:
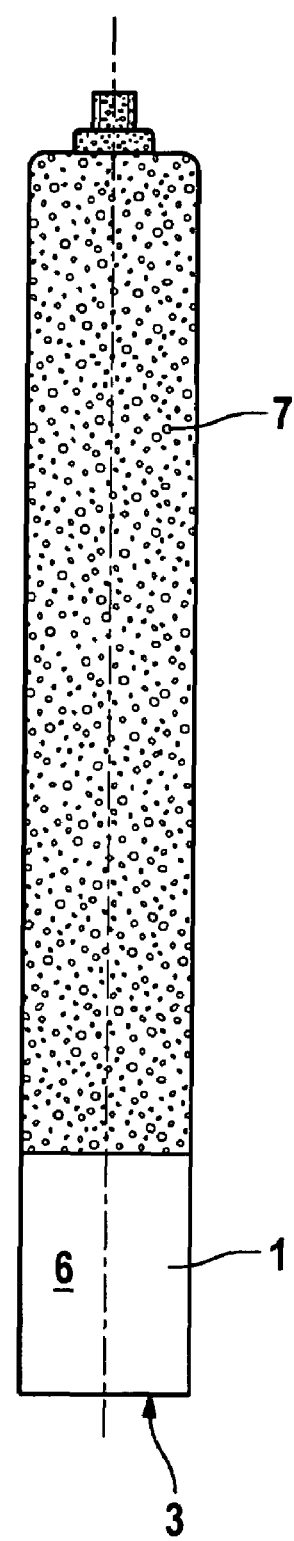
FIG. 2: shows the pressure tube from FIG. 1 with a powder coating.

Then a cylindrical end region 6 of the pressure tube 1 starting from the open end 3, as shown in FIG. 2, is covered. Next, a surface protection which includes a powder coating 7 is applied to the pressure tube 1 in a powder coating process and this powder coating is then fired in a thermal step, with the cylindrical end region 6 remaining excluded on account of it being covered, and consequently not receiving a powder coating. Therefore, the outer surface of the pressure tube 1 is now formed by the basecoat in the end region 6 starting from the open end 3 and by the powder coating 7 in the remaining regions of the pressure tube 1.

Figure 3:
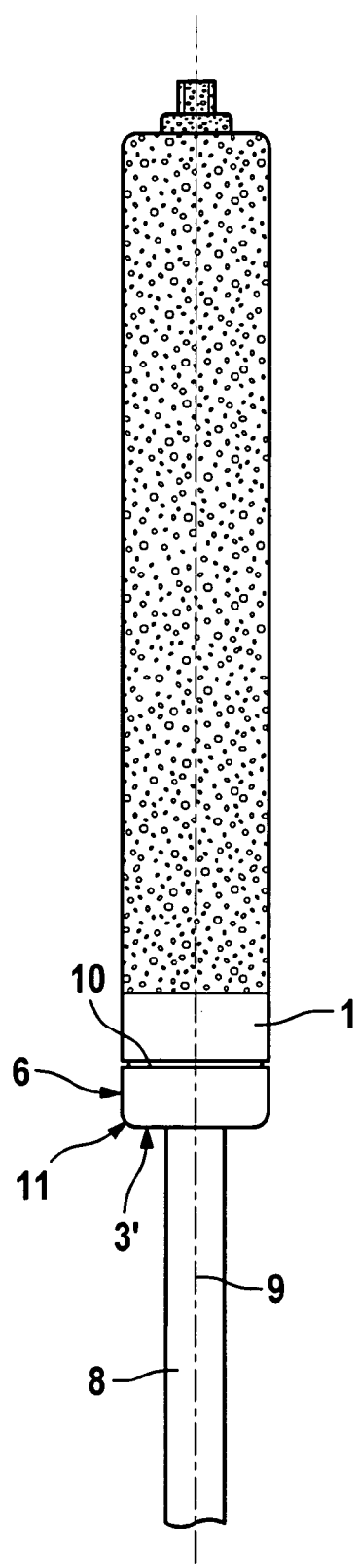
FIG. 3: shows the pressure tube from FIG. 2 with a piston rod.

Then, internal components, which include inter alia a piston, a piston rod 8 (cf. FIG. 3), a piston rod guide and a piston rod seal, are inserted into the pressure tube 1. Moreover, a pressure fluid, preferably gas, is introduced into the pressure tube 1 at an admission pressure. The internal components and pressure fluid can now be introduced without danger, since no further heat—as will be used, for example, in the abovementioned powder coating process—is applied to the pressure tube 1. Consequently, there is no risk of subsequent damage to the internal components or of undesirable expansion of the pressure fluid, which could lead to the pressure tube 1 being destroyed.

Next, an encircling bead 10 which faces radially inwards, i.e. towards the pressure tube centre axis 9, is formed in the cylindrical end region 6 which has been excluded from the powder coating process. The bead 10 supports the piston rod guide and/or piston rod seal arranged in the pressure tube 1 in the axial direction.

Moreover, the pressure tube 1 is flanged radially inwards at the open end 3 (cf. FIG. 2). The resulting flange 11 firstly closes off the pressure tube 1 at the end 3 and secondly supports the piston rod guide and/or the piston rod seal in the axial direction. Moreover, the edge of the flange 11 which faces towards the pressure tube centre axis 9 forms an end opening in the pressure tube 1, through which the piston rod 8 is led out of the interior of the pressure tube 1. The originally open end is now a piston rod exit end 3'.

Since the end region 6 which was excluded from the powder coating process does not have a powder coating, there is no risk of the powder coating becoming detached, in particular flaking off, as a result of the pressure-tube material flowing either during introduction of the bead or during the flanging operation.

Figure 4:
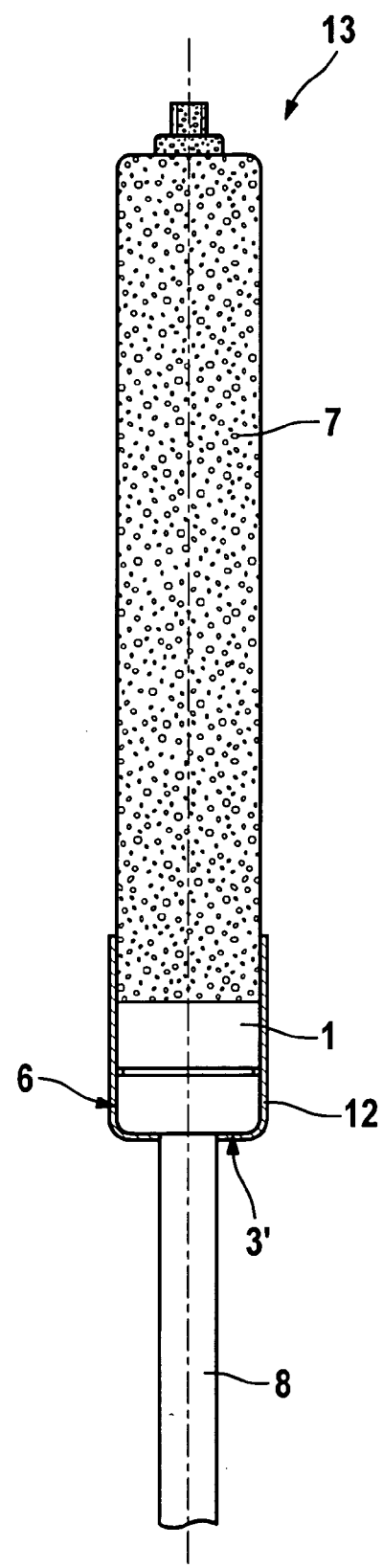
FIG. 4: shows the pressure tube from FIG. 3 with a protective cap.

Finally, a corrosion prevention oil is applied to the end region 6 of the pressure tube 1 which was excluded from the powder coating process, and a protective cap 12, which is illustrated in FIG. 4 and consists of an elastomeric plastic, is fitted on to it, in particular protecting the basecoat from mechanical abrasion. This completes the production of the piston-cylinder unit 13.

What is claimed is:

1. A method for producing a piston-cylinder unit comprising a cylindrical pressure tube having a piston-rod-exit end, and a piston axially displaceable in the pressure tube and having a piston rod sealingly extending through the piston-rod-exit end, the method comprising the steps of:
    forming the pressure tube so that one end thereof is an open end;
    applying a surface protection coating to the pressure tube except a cylindrical end region starting from the open end; and
    after applying the surface protection coating, forming a radially inward directed flange at the piston rod exit end.

2. The method of claim 1, wherein the surface protection coating is applied by a powder coating process.

3. The method of claim 1, wherein the end region is covered while applying the surface protection coating.

4. The method of claim 1, further comprising applying a basecoat to an entire outer surface of the pressure tube before applying the surface protection coating.

5. The method of claim 1, further comprising, after applying the surface protection coating and before forming the flange, introducing the piston and the piston rod into the pressure tube, and filling the pressure tube with a pressure fluid.

6. The method of claim 5, further comprising, after introducing the piston and piston road, forming a radially inward directed circumferential bead to the end region.

7. The method of claim 1, further comprising applying a corrosion-resistant oil to the end region, and fitting a protective cap to the end region.

8. The method of claim 6 further comprising, after forming the circumferential bead and before forming the flange, introducing at least one of a piston rod guide and a piston rod seal in the end region, whereby said at least one of a piston rod guide and a piston rod seal is positioned axially between the bead and the circumferential flange.

9. The method of claim 2 further comprising firing said surface protection coating prior to installing any components or forming said flange.

* * * * *